United States Patent
Cooper

(10) Patent No.: US 7,217,056 B2
(45) Date of Patent: May 15, 2007

(54) KNUCKLE-SWIVEL FOR DRILLING WELLS

(76) Inventor: Larry V. Cooper, P.O. Box 16573, Lake Charles, LA (US) 70616

(*) Notice: Subject to any disclaimer, the term of this patent is extended or adjusted under 35 U.S.C. 154(b) by 0 days.

(21) Appl. No.: 10/416,190

(22) PCT Filed: Nov. 9, 2001

(86) PCT No.: PCT/US01/43034

§ 371 (c)(1),
(2), (4) Date: May 9, 2003

(87) PCT Pub. No.: WO02/38907

PCT Pub. Date: May 16, 2002

(65) Prior Publication Data

US 2004/0035572 A1 Feb. 26, 2004

(51) Int. Cl.
*F16C 11/00* (2006.01)
(52) U.S. Cl. ...................................................... 403/35
(58) Field of Classification Search ........ 403/135–138, 403/141–144
See application file for complete search history.

(56) References Cited

U.S. PATENT DOCUMENTS

| | | | | | |
|---|---|---|---|---|---|
| 2,921,809 | A | * | 1/1960 | Kogstrom | 403/134 |
| 2,954,993 | A | * | 10/1960 | Scheublein, Jr. et al. | 403/134 X |
| 2,957,714 | A | * | 10/1960 | Langen | 403/135 |
| 4,128,127 | A | * | 12/1978 | Taylor | 166/105 |
| 5,468,153 | A | * | 11/1995 | Brown et al. | 439/13 |

FOREIGN PATENT DOCUMENTS

WO  00/52296  9/2000

* cited by examiner

*Primary Examiner*—Daniel P. Stodola
*Assistant Examiner*—Joshua T. Kennedy
(74) *Attorney, Agent, or Firm*—William H. Holt

(57) ABSTRACT

A knuckle-swivel (10) is used with well drilling equipment for protecting helical wound line 62, which may be wire rope, cable and/or strand, against torsional forces and also providing for angular displacement of sinker bars or other tools during wireline strip over operations to minimize interference with rig equipment (80) when pulling pipe or tools 64 from a well head.

9 Claims, 2 Drawing Sheets

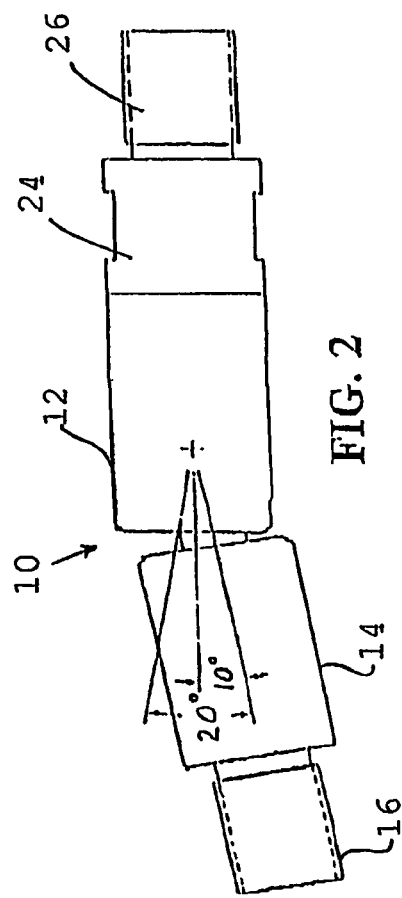
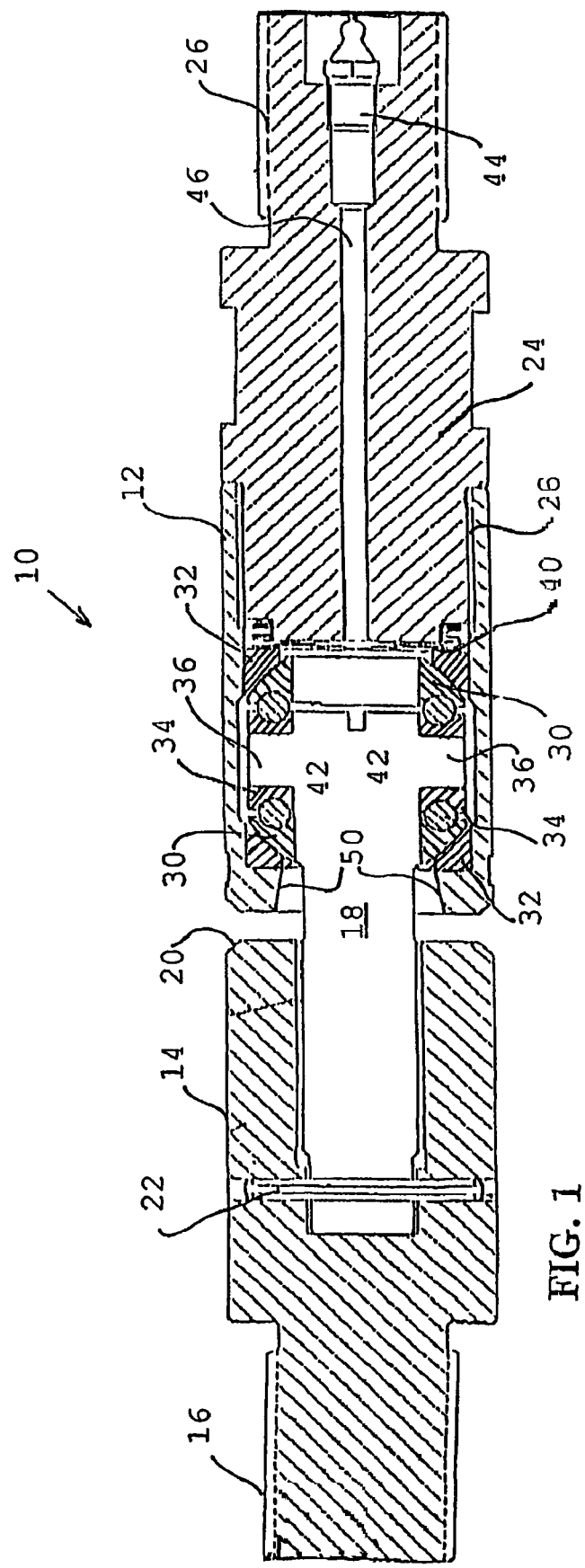

KNUCKLE-SWIVEL FOR DRILLING WELLS

BACKGROUND OF THE INVENTION

Many conventional drilling rigs use a top-drive for pulling pipe and/or tools from a well bore. Powerful motors are used to pull and wind wire rope, cable or strand about a drum located above the derrick floor. Swivels are used in-line with helical wound members such as rope, cable or strand for allowing rotation about a longitudinal axis thereof under tension for minimizing or avoiding straightening of the helical windings in order to protect the strength and integrity of the rope, cable or strand by compensating for the torsional force induced by large axial forces on the helical member. Typical forces can be on the order of several tons, or more.

In one typical operation referred to as a "wireline strip over operation", a sinker bar is used in-line with the wire rope. Sinker bars have in the past been comprised of a rigid member which may be in the form of a solid bar on the order of 15 to 20 feet in length. Use of such a sinker bar with a top drive creates interference between the sinker bar and rig equipment located vertically above the drill pipe; heretofore, it has been necessary to move and relocate the top drive unit out of the way. This is a time consuming operation that is best to be avoided.

SUMMARY OF THE INVENTION

The invention relates to the use of a unique implement which is now referred to as a "knuckle=swivel" and which provides for the multiple function of introducing a 360 degree swivel capability for minimizing and/or precluding the above referred torsional forces on the rope, cable or strand and, in addition, provides for a knuckle function to allow angular displacement for minimizing or precluding bending loads transmitted into the swivel during withdrawal of sinker bars from the well bore or other tools and the like being pulled around an obstacle.

The present invention is particularly useful for well drilling operations including but not limited to those utilizing a top drive winding drum for pulling items from the well bore and, more particularly, the invention is intended to be used with "Flexible Sinker Bar Assemblies" which are the subject of my U.S. Pat. No. 6,227,292 B1, granted on May 8, 2001; the disclosure of my earlier patent is incorporated herein by reference. An important feature of the present invention resides in the combination of the instant knuckle-swivel and a sinker bar, either a rigid sinker bar or ideally a flexible sinker bar, in order to minimize or preclude the heretofore requirement of moving the top drive unit during pulling operations.

BRIEF DESCRIPTION OF THE DRAWINGS

FIG. 1 is a longitudinal, sectional view of a knuckle-swivel in accordance with the invention.

FIG. 2 is a side elevational view of the knuckle-swivel showing the extent of side rotation.

DESCRIPTION OF THE PREFERRED EMBODIMENT

Figure 4:
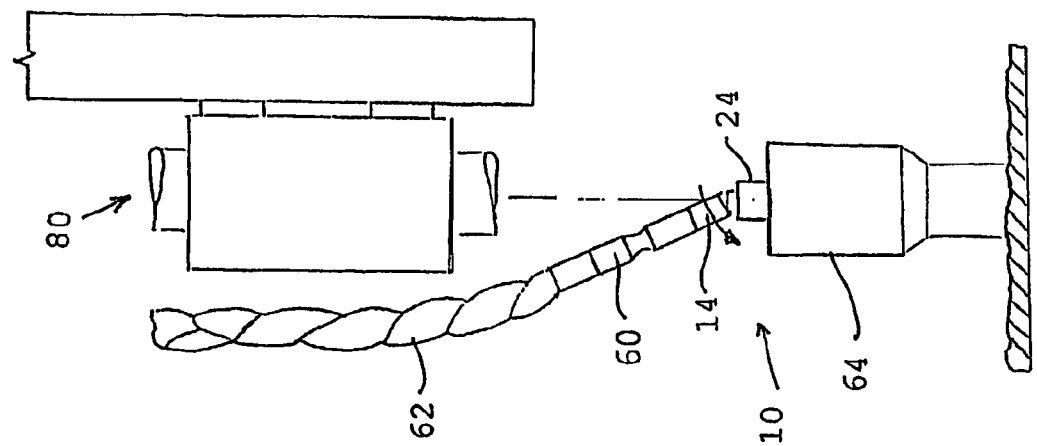
FIG. 4 is a schematic view showing a helical wound rope, cable or strand being diverted around rig equipment with the knuckle-swivel located at the mouth of the well.

A knuckle-swivel body member, generally indicated by the numeral 10, includes a bottom sub 14 having threads 16 at one end thereof and receiving a bearing pin 18 in its opposite hollow end 20 and being connected thereto by a slotted spring pin 22.

An upper sub 24 includes a first threaded end 26 and a second threaded end 28, the latter being connected to the knuckle-swivel body member 10 in alignment with bottom sub 14. Body member 10 contains a pair of bearing cones 30, 30, a pair of bearings cups 32, 32 and a pair of bearing races 34, 34 which are mounted upon cylindrical posts 36, 36 disposed on opposite sides of bearing pin 18. A flat wire compression spring 40, of a type known as a crest-to-crest spring, is located between one bearing cup 32 and the adjacent end of upper sub 24 for applying a constant force against the cup 32 for stabilizing a plurality of ball bearings 42 between the bearing cones 30, 30 and the bearing races 34, 34. A grease fitting 44 is provided for passing lubricant through a passage 46, it being understood that the lubricant can pass through spring 40 and protect the various bearing components.

As is best shown in FIG. 1, body member 12 is provided with a frusto-conical surface 50 which limits bearing pin 20 to approximately 20 degrees of side-to-side rotation, the extent of rotation being best shown in FIG. 2. Thus, bearing pin 18 is capable of rotating 360 degrees about its longitudinal axis within body member 12 in addition to a side-to-side conical movement of 20 degrees.

Figure 3:
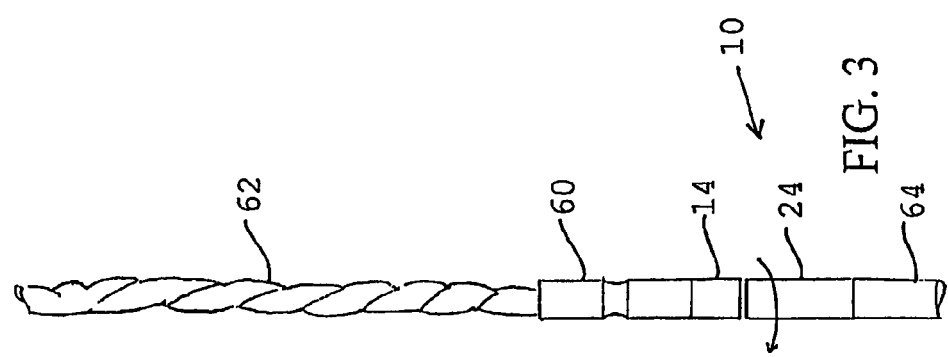
FIG. 3 is a schematic representation of the knuckle-swivel connected to a helical wound wire rope, cable or strand which comprises part of a sinker bar.

Referring to FIGS. 3 and 4, it will be seen that the knuckle-swivel 10 is secured by a swaged end connector 60 to a line 62, which may be a helical wound wire rope, or cable, or strand member. It is to be understood that helical wound line 62 is protected by knuckle-swivel 10 because of the capability of 360 degrees of axial rotation of bearing pin 18 minimizes or precludes torsional forces upon the line 62. In the absence of such protection, large axial loads would tend to straighten the helical windings and thereby severely weaken the strength of the line 62. End connector 60 is threaded onto sub 14, and sub 24 can be threadedly connected to a pipe or tool 64.

It is to be understood that it is conventional in the well drilling industry to provide a top drive (not shown) in the form of a winding drum located at or near the top of a derrick or rig, for pulling pipe or tools from the well. It is not unusual for portions of the derrick or rig to be interposed between the well head and the winding drum. As a result, it has heretofore been necessary to mount the top drive so that it may be adjustably moved laterally to prevent interference between the pulling line and rig. As is best shown in FIG. 4, line 62, which may be a component of a flexible sinker bar as described in U.S. Pat. No. 6,227,292, can be angularly displaced while under load because of the provision of knuckle-swivel 10. As a result, interference with rig equipment, generally indicated by the numeral 80, is avoided and it is unnecessary to move or relocate the top drive member. Line 62 can be trained over a guide roller (not shown) upwardly of or adjacent the rig equipment 80 for preventing contact during a wireline strip over operation, or the like.

From the foregoing, the preferred construction of the invention will be obvious to those skilled in this art but it is to be understood that some changes in construction and operation are possible without departing from the spirit and scope of the invention as defined in the claimed subject matter appended hereto.

I claim:

1. A knuckle-swivel for use with well servicing equipment comprising a pair of subs (14 and 24), a bearing pin (18) connected between said subs, a bearing member carried at one end of said bearing pin and providing for 360 degree rotation about a longitudinal axis thereof, a body member (12) surrounding said bearing member and including a frusto-conical surface providing for rotation of said bearing pin away from said longitudinal axis, wherein said bearing member is comprised of a pair of bearing cones (30), a pair of bearing cups (32), and a pair of bearing races connected to a pair of cylindrical posts carried by said bearing pin (18).

2. A knuckle-swivel as defined in claim 1 including a spring (40) disposed between one of said bearing cups (32) and an end of said sub (24).

3. A knuckle-swivel as defined in claim 2 wherein said frustoconical surface is provided at one end of said sub (24) and provides for approximately 20 degree angular movement of said bearing pin (18) from its longitudinal axis.

4. A knuckle-swivel comprising a pair of subs (14 and 24), a bearing pin (18) connected between said subs, a bearing member carried at one end of said bearing pin and providing for 360 degree rotation about a longitudinal axis thereof, a body member (12) surrounding said bearing member and including a frusto-conical surface providing for rotation of said bearing pin away from said longitudinal axis, wherein said bearing member is comprised of a pair of bearing cones (30), a pair of bearing cups (32), and a pair of bearing races connected to a pair of cylindrical posts carried by said bearing pin (18).

5. A knuckle swivel as defined in claim 4 wherein a grease fitting (44) is disposed axially within one of said subs for providing lubricant to said bearing member.

6. A knuckle-swivel as defined in claim 4 including a spring (40) disposed between one of said bearing cups (32) and an end of said sub (24).

7. A knuckleswivel as defined in claim 4 wherein said frusto-conical surface is provided at one end of said sub (24) and provides for approximately 20 degree angular movement of said bearing pin (18) from its longitudinal axis.

8. A knuckle-swivel as defined in claim 4 in combination with a pulling line (62) for minimizing torsional forces upon said line during a pulling operation.

9. The combination as defined in claim 8 wherein said line (62) comprises at least a portion of a sinker bar.

* * * * *